(12) United States Patent
Tsuduki et al.

(10) Patent No.: US 7,717,400 B2
(45) Date of Patent: May 18, 2010

(54) FLUID PRESSURE REGULATING DEVICE

(75) Inventors: Yoji Tsuduki, Obu (JP); Hikaru Kikuta, Obu (JP); Takuya Ito, Obu (JP); Hiroshi Oda, Obu (JP); Yasunori Takaku, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 523 days.

(21) Appl. No.: 11/737,290

(22) Filed: Apr. 19, 2007

(65) Prior Publication Data
US 2008/0257419 A1    Oct. 23, 2008

(51) Int. Cl.
F16K 31/02    (2006.01)
(52) U.S. Cl. .............. 251/129.21; 239/585.1; 239/585.5
(58) Field of Classification Search ............ 251/129.15, 251/129.21; 239/585.1–585.5
See application file for complete search history.

(56) References Cited
U.S. PATENT DOCUMENTS
6,244,253 B1    6/2001    Haeberer et al.
6,508,418 B1 *  1/2003    Fochtman et al. ........ 239/585.4
6,805,310 B2 * 10/2004    Yamashita ............... 239/585.1
7,097,151 B2 *  8/2006    Akabane ................. 251/129.18

FOREIGN PATENT DOCUMENTS
JP    08 093957       4/1996
JP    2002 515565    5/2002

* cited by examiner

*Primary Examiner*—John K Fristoe, Jr.
(74) *Attorney, Agent, or Firm*—Dennison, Schultz & MacDonald (57) ABSTRACT

A body 20 has body wall surfaces 21, 22 defining a body space inside. A core 30 is disposed within the body 20. The core 30 has a core wall surface defining a core space inside which has a bottom having an opening 33a. A valve 50 is inserted through the opening 33a of the core 30 with a clearance and can move along the core wall surface of the core 30. The valve 50 has a hole with a bottom which is comprised of holes 52a, 53a, 57a, a contact surface 58 that contacts the core wall surface of the core 30, a valve head 59 that can contact a valve seat 40, at least one first communication hole 55 that provides communication between the hole 53a and a second inflow fuel passage 30a within the core space, and at least one second communication hole 54 that provides communication between the hole 52a and the first inflow fuel passage 21a, 22a within the body space.

6 Claims, 4 Drawing Sheets

PRIOR ART

FLUID PRESSURE REGULATING DEVICE

BACKGROUND OF THE INVENTION

1. Field of the Invention

The present invention relates to a fluid pressure regulating device that prevents pressure increase of fluid.

2. Description of the Related Art

A fluid pressure regulating device is used to prevent pressure increase of fluid. For example, a relief valve is used to prevent pressure increase of fuel to be supplied to a fuel injector of an internal combustion engine.

Figure 6:
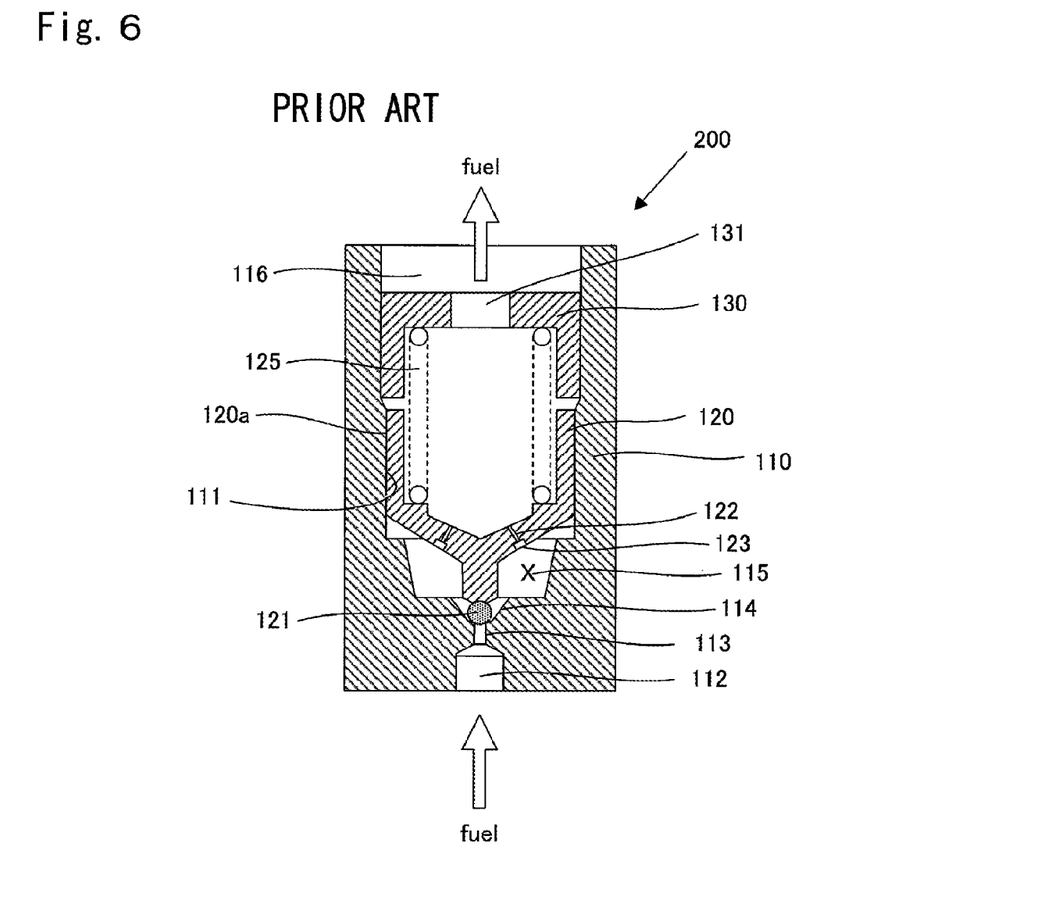
FIG. 6 is a sectional view showing a known relief valve.

Japanese laid-open patent publication No. 2002-515565 a relief valve 200 shown in FIG. 6. The relief valve 200 has a casing 110. The casing 110 has a wall surface 111 defining a casing space inside which axially extends through the casing 110. A sealing surface 114 is formed on the side of one axial end (upstream end) of the wall surface 111 of the casing 110. A hole 113 is formed between the sealing surface 114 and a fuel inlet 112. Further, a cup-shaped stopper 130 is provided on the side of the other axial end (downstream end) of the casing space. A communication hole 131 for leading fuel to a fuel outlet 116 is formed in the stopper 130. Further, a cup-shaped valve 120 is disposed between the stopper 130 and the sealing surface 114 such that the valve 120 can move (slide) along the casing space. The valve 120 has a contact surface 120a that contacts the wall surface 111 of the casing 110, and a sealing ball 121 that can contact the sealing surface 114. A spring 125 is disposed between the stopper 130 and the valve 120. The spring 125 generates an elastic force that moves the valve 120 in the direction in which the sealing ball 121 contacts the sealing surface 114. The valve 120 has a communication hole 122. A throttle element 123 is provided in the communication hole 122 on the side of the sealing surface 114 (upstream side).

The relief valve 200 operates as follows. When the pressure of fuel that flows in through the fuel inlet 112 (that is supplied to the fuel injector) exceeds a set pressure which is determined according to the elastic force of the spring 125, the valve 120 moves in the valve opening direction (upward as viewed in FIG. 6) by the fuel pressure. As a result, contact between the sealing ball 121 and the sealing surface 114 is released, and fuel led in through the fuel inlet 112 is discharged from the fuel outlet 131 via the throttle element 123 and the communication holes 122, 131. On the other hand, when the pressure of fuel that flows in through the fuel inlet 112 is reduced to below the set pressure determined according to the elastic force of the spring 125, the valve 120 moves in the valve closing direction (downward as viewed in FIG. 6) by the elastic force of the spring 125. As a result, the sealing ball 121 contacts the sealing surface 114, so that the discharge of fuel ceases. The throttle element 123 disposed in the communication hole 122 serves to weaken the force which moves the valve 120 when the valve 120 contacts the stopper 130 or the sealing surface 114.

In the relief valve 200 shown in FIG. 6, an inflow chamber (inflow fuel passage) 115 is formed on the upstream side of the contact surface 120a of the valve 120 (below the contact surface 120a as viewed in FIG. 6) by a throttle section (formed of the hole 113 and the communication hole 122) for throttling the fuel flow. Therefore, when the valve 120 moves in the valve opening direction (upward as viewed in FIG. 6), the pressure within the inflow chamber 115 increases. The pressure of fuel within the inflow chamber 115 acts upon the valve 120 as a force which moves the valve 120 in the valve opening direction (upward as viewed in FIG. 6). Therefore, even if the pressure of fuel flowing in through the fuel inlet 112 is reduced to below the set pressure determined according to the elastic force of the spring 125, the movement of the valve 120 in the valve closing direction (downward as viewed in FIG. 6) is prevented by the fuel pressure within the inflow chamber 115. In this case, the operating characteristic of the valve 120 is deteriorated, so that the pressure of the fuel flowing in through the fuel inlet 112 or the fuel to be supplied to the fuel injector decreases.

Further, an outflow chamber (outflow fuel passage) may be formed on the downstream side of the contact surface 120a of the valve 120 (upward as viewed in FIG. 6) by a throttle section (for example, formed of the communication holes 122 and 131). In this case, likewise, the pressure within the outflow chamber increases. The fuel pressure within the outflow chamber acts upon the valve 120 as a force which moves the valve 120 in the valve closing direction (downward as viewed in FIG. 6). Therefore, even if the pressure of fuel flowing in through the fuel inlet 112 exceeds the set pressure determined according to the elastic force of the spring 125, the movement of the valve 120 in the valve opening direction (upward as viewed in FIG. 6) is prevented by the fuel pressure within the outflow chamber. In this case, the operating characteristic of the valve 120 is deteriorated, so that the pressure of the fuel flowing in through the fuel inlet 112 or the fuel to be supplied to the fuel injector increases.

In this manner, if an intermediate chamber (an inflow fluid passage or an outflow fluid passage) in which the fluid is stored is provided upstream or downstream of the valve contact surface by the throttle section, the operating characteristic of the valve may be deteriorated due to the pressure of fluid within the intermediate chamber.

SUMMARY OF THE INVENTION

Accordingly, it is an object of the present invention to provide a technique for preventing the operating characteristic of a valve from being deteriorated due to the existence of a fluid passage in which fluid is stored.

In one aspect of the present invention, the pressure of fluid is regulated by using the elastic force. The fluid pressure regulating device of this aspect of the invention includes a fluid passage disposed between a fluid inlet and a fluid outlet, a valve seat disposed in the fluid passage, a valve that can move along the fluid passage and includes a contact surface that contacts a wall surface defining the fluid passage and a valve head that can contact the valve seat, and an elastic force generating member that generates an elastic force that moves the valve in a direction in which the valve head contacts the valve seat. The elastic force generating member typically comprises a spring. This invention is not limited to the type in which the valve is moved only by an elastic force. For example, the valve may be moved by an elastic force and an electromagnetic force.

The fluid passage includes an inflow fluid passage disposed on the upstream side (fluid inlet side) of the contact surface of the valve, and an outflow fluid passage disposed on the downstream side (fluid outlet side) of the contact surface of the valve. Further, a first communicating part is provided to provide communication between the inflow fluid passage and the outflow fluid passage. The inflow fluid passage serves as a space in which fluid is stored because the fluid flow is throttled by the valve seat and the first communicating part. A fluid passage which is disposed upstream of the contact surface and has no throttle section between this fluid passage and the outflow fluid passage disposed downstream of the contact surface forms part of the outflow fluid passage. For example, a hole formed in the valve and having a bottom and being open on the downstream side forms part of the outflow fluid passage.

In this aspect of the invention, the inflow fluid passage includes a first inflow fluid passage, a second inflow fluid passage disposed downstream of the first inflow fluid passage (on the side of the contact surface of the valve), and a throttle section disposed between the first inflow fluid passage and the second inflow fluid passage. The throttle section comprises, for example, a clearance between an opening (communicating part) formed in a wall disposed in the middle of the inflow fluid passage and a valve inserted through the opening. The opening through which the valve is inserted serves, for example, as a movement restricting member for restricting movement of the valve.

In the construction in which a wall is disposed in the middle of the inflow fluid passage and the inflow fluid passage is partitioned into a space on the side of the contact surface of the valve (second inflow fluid passage) and a space on the side of the valve seat (first inflow fluid passage), fluid is stored in the both spaces. In this case, pressure increase of fluid has a larger influence on the operating characteristic of the valve in the second inflow fluid passage than in the first inflow fluid passage. Therefore, in this aspect of the invention, the first communicating part is provided to provide communication between the second inflow fluid passage and the outflow fluid passage. The total opening space of the first communicating part is set such that the valve is prevented from moving due to pressure increase of fluid within the second inflow fluid passage.

In the construction in which the capacity of the second inflow fluid passage is larger than that of the first inflow fluid passage, pressure increase of fluid within the second inflow fluid passage has a still larger influence on the operating characteristic of the valve. Therefore, this aspect of the invention can be suitably applied particularly to the case in which the capacity of the second inflow fluid passage is larger than that of the first inflow fluid passage.

It is only essential for the first communicating part to provide communication between the second inflow fluid passage and the outflow fluid passage. The first communicating part typically comprises at least one communication hole. The shape and the number and the position of the communication holes can be appropriately selected.

The total opening space of the first communicating part is preferably set to be sixteen times or more larger than the opening space of the valve seat. The opening space of the valve seat corresponds to the minimum opening space of the sealing surface of the valve seat. With such construction, a desirable operating characteristic can be obtained against the change of the pressure of fluid within the first and second inflow fluid passages.

The valve can be formed with a hole having a bottom and open on the downstream side. In this case, the first communicating part can comprise at least one communication hole that provides communication between the second inflow fluid passage and the hole of the valve. With this construction, the first communicating part can be simplified in construction.

In this case, preferably, the hole of the valve includes a first hole and a second hole that is disposed downstream of the first hole and has a larger section perpendicular to its axial direction than the first hole. The first communicating part can comprise at least one communication hole that provides communication between the second inflow fluid passage and the second hole of the valve. With this construction, the pressure of fluid within the second inflow fluid passage can be effectively reduced.

Further, a second communicating part that provides communication between the first inflow fluid passage and the first hole of the valve can be provided. The second communicating part typically comprises at least one hole that provides communication between the first inflow fluid passage and the first hole of the valve. By providing the first communicating part that provides communication between the second inflow fluid passage and the outflow fluid passage and the second communicating part that provides communication between the first inflow fluid passage and the outflow fluid passage, pressure increase of fluid within the second inflow fluid passage and pressure increase of fluid within the first inflow fluid passage can be prevented. As a result, the operating characteristic of the valve can be improved.

Further, preferably, the total opening space of the first communicating part is set to be larger than that of the second communicating part. With this construction, pressure increase of fluid within the second inflow fluid passage and pressure increase of the fluid within the first inflow fluid passage can be more effectively prevented.

Further, preferably, the sum of the total opening space of the first communicating part and the total opening space of the second communicating part is set to be sixteen times or more larger than the opening space of the valve seat. With this construction, a desirable operating characteristic can be obtained against the change of the pressure of the fuel within the first and second inflow fluid passages.

In another aspect of this invention, fluid pressure is regulated by using an elastic force and an electromagnetic force. The fluid pressure regulating device of this aspect of the invention includes a body having a body space which extends axially through the body, a core disposed within the body and having a core space which has a bottom having an opening (communicating part), a holder disposed within the core and having a holder space which extends axially through the holder, and a coil disposed outside the core. The valve seat is disposed within the body. The valve is inserted through the opening of the bottom of the core space with a clearance and the contact surface of the valve contacts the core wall surface defining the core space. The first inflow fluid passage is defined by the body, the valve seat, the valve and the core. The second inflow fluid passage is defined by the valve and the core. The outflow fluid passage is defined by the valve, the holder and the core. An electromagnetic force of moving the valve along the core wall surface is generated by passage of electric current through the coil.

In this aspect of the invention, a pressure limit can be set by the elastic force and the electromagnetic force, so that the pressure of fluid can be accurately regulated. The core serves as a magnetic flux passage through which magnetic flux for generating the electromagnetic force is led to the valve. Further, the wall surface defining the opening of the bottom wall of the core serves as a movement restricting member for restricting movement of the valve in a direction perpendicular to its axial direction. In this case, the core bottom wall partitions the inflow fluid passage into the first inflow fluid passage on the upstream side and the second inflow fluid passage on the downstream side. Particularly, the pressure increase of fluid within the second inflow fluid passage on the downstream side has a large influence on the operating characteristic of the valve. In this aspect of the invention, the first communicating part is provided to provide communication between the second inflow fluid passage and the outflow fluid passage, so that the operating characteristic of the valve can be prevented from being influenced by the pressure increase of fluid within the second inflow fluid passage.

In the construction in which the valve is supported only by contact between the contact surface on the side of one end (downstream side) of the valve and the wall surface defining the fluid passage, the side of the other end (upstream side) of the valve moves perpendicularly to its axial direction. When the side of the other end of the valve moves perpendicularly to its axial direction, contact resistance between the contact surface of the valve and the wall surface defining the fluid passage increases, so that the operating characteristic of the valve is deteriorated. In a further different aspect of this invention, the contact surface of the valve has a circular arc shape having a radius of 7 mm or more. With this construction, even when the valve moves perpendicularly to its axial direction, contact resistance between the contact surface of the valve and the wall surface defining the fluid passage does not increase. Therefore, deterioration of the operating characteristic of the valve due to increase of the contact resistance can be prevented.

In a further different aspect of this invention, the fluid pressure regulating device includes a fluid passage provided between a fluid inlet and a fluid outlet, a valve seat disposed in the fluid passage, a contact surface that can move along the fluid passage and contacts a wall surface defining the fluid passage, a valve having a valve head that can contact the valve seat, and an elastic force generating member that generates an elastic force of moving the valve in a direction in which the valve head contacts the valve seat. The fluid passage includes an inflow fluid passage disposed on the fluid inlet side (upstream) of the contact surface of the valve, an outflow fluid passage disposed on the fluid outlet side (downstream) of the contact surface of the valve, and a first communicating part that provides communication between the inflow fluid passage and the outflow fluid passage. The fluid passage typically comprises the inflow fluid passage, the outflow fluid passage and the first communicating part that provides communication between the inflow fluid passage and the outflow fluid passage. In this aspect of the invention, the total opening space of the first communicating part is set to be sixteen times or more larger than the opening space of the valve seat. With this construction, a desirable operating characteristic can be obtained against the change of the pressure of fluid within the inflow fluid passage.

In this aspect of the invention, it is also preferable that the contact surface of the valve has a circular arc shape having a radius of 7 mm or more.

Other objects, features and advantages of the present invention will be readily understood after reading the following detailed description together with the accompanying drawings and the claims.

DETAILED DESCRIPTION OF THE INVENTION

Each of the additional features disclosed above and below may be utilized separately or in conjunction with other features to provide improved fluid pressure regulating device. Representative examples of the present invention will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features disclosed within the following detailed description may not be necessary to practice the invention in the broadest sense.

Figure 1:
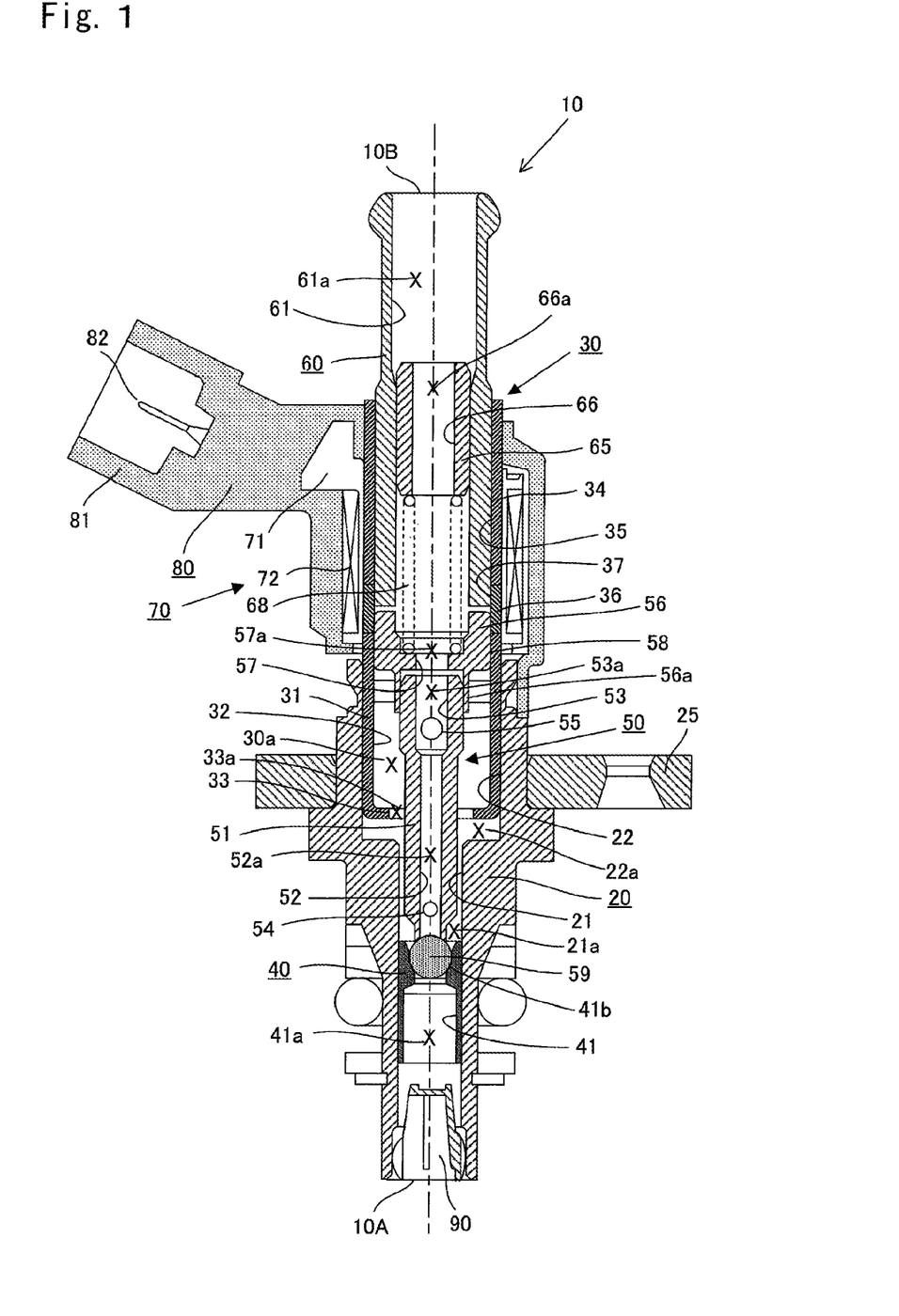
FIG. 1 is a sectional view showing an embodiment of the present invention.

FIG. 1 is a sectional view showing an embodiment of the present invention. In the embodiment shown in FIG. 1, the technique of the present invention is applied to a relief valve 10 for preventing pressure increase of fuel to be supplied to a fuel injector of an internal combustion engine. In the following description, the upstream side with respect to the direction of flow of the fuel (downward as viewed in FIG. 1) will be referred to as the "upstream side", and the downstream side with respect to the direction of flow of the fuel (upward as viewed in FIG. 1) will be referred to as the "downstream side".

The relief valve 10 of this embodiment is mounted to a plate 25.

The relief valve 10 includes a body 20, a core 30, a valve seat 40, a valve 50, a holder 60, a driving section 70 and a housing 80.

The body 20 has a body wall surface defining a body space inside which extends axially (vertically as viewed in FIG. 1) through the body. In this embodiment, the body wall surface comprises body wall surfaces 21, 22 forming a step therebetween. The body wall surface 21 is disposed on the upstream side of the body wall surface 22. The body wall surface 22 is disposed on the downstream side of the body wall surface 21. The inner diameter of the body wall surface 22 is larger than that of the body wall surface 21.

The core 30 is disposed within the body 20 (in the body space defined by the body wall surface 22). The core 30 is inserted into the body space, for example, by press fitting.

The core 30 includes a first core 31, a second core 34, and a third core 36 disposed between the first core 31 and the second core 34. The first and second cores 31, 34 are formed of a magnetic material and the third core is formed of a non-magnetic material.

The core 30 has a core wall surface defining a core space having a bottom (having a cup-like shape). Specifically, the core 30 is shaped to have a bottom. In this embodiment, a second core wall surface 35 of the second core 34 and a third core wall surface 37 of the third core 36 form a side wall of the core space, and a first core wall surface 32 of the first core 31 forms a side wall and a bottom wall of the core space.

The core space having a bottom and defined by the core wall surface is open on the downstream side (on the upper side as viewed in FIG. 1). Further, an opening (communication hole) is axially formed through the bottom wall of the core space. Specifically, an opening (communication hole) 33a is formed in the bottom wall of the first core 31 and defined by a wall surface 33. A valve body 51 of the valve 50 is inserted through the opening 33a with a clearance.

The core 30 serves as a magnetic flux passage for leading magnetic flux to the valve 50 (an armature 56). Further, the wall surface 33 defining the opening 33a of the bottom wall of the core 30 (the bottom wall of the first core 31) serves as a movement restricting member for restricting movement of the valve 50 in a direction perpendicular to the axial direction (in a lateral direction as viewed in FIG. 1).

The valve seat 40 is disposed within the body 20 (in the body space defined by a body wall surface 21). The valve seat 40 is inserted into the body space defined by the body wall surface 21, for example, by press-fitting.

The valve seat 40 has a valve seat wall surface 41 which defines a valve seat space 41a axially extending through the valve seat 40. A sealing surface 41b is formed in the valve seat wall surface 41 and can contact a valve head 59 of the valve 50. When the valve head 59 contacts the sealing surface 41b, the valve seat space 41a is closed, so that fuel led in through a fuel inlet 10A is not allowed to be discharged from a fuel outlet 10B ("closed state"). On the other hand, when the contact between the valve head 59 and the sealing surface 41b is released, the valve seat space 41a is opened, so that fuel led in through the fuel inlet 10A is allowed to be discharged from the fuel outlet 10B ("open state").

The minimum opening space of the sealing surface 41b corresponds to the opening space of the valve seat 40.

The valve 50 is disposed within the core 30 (in the core space defined by the core wall surface) such that the valve 50 can move (slide) along the core wall surface. The valve 50 includes the valve body 51, the armature 56 and the valve head 59.

The valve head 59 is disposed on the upstream side of the valve body 51 (on the side opposed to the sealing surface 41b of the valve seat 40). The valve head 59 and the sealing surface 41b are configured such that the valve seat space 41a defined by the valve seat wall surface 41 is closed when the valve head 59 contacts the sealing surface 41b.

The armature 56 is disposed on the downstream side (the upper side as viewed in FIG. 1) of the valve body 51.

The armature 56 is formed of magnetic material. The armature 56 has an armature wall surface 57 which defines a hole 57a axially extending through the armature. A contact surface (sliding surface) 58 is formed on the outer periphery of the armature 56 and contacts the core wall surface of the core 30. The valve 50 can move along the core wall surface with the contact surface 58 of the armature 56 held in contact with the core wall surface of the core 30.

Further, a fitting wall 56a is formed on the upstream side (the lower side as viewed in FIG. 1) of the armature 56 and defines a fitting hole. A downstream end (an upper end as viewed in FIG. 1) of the valve body 51 is fixedly inserted into the fitting hole of the armature 56. Thus, the armature 56 and the valve body 51 are integrated. At this time, preferably, a clearance is formed between the downstream end of the valve body 51 and the bottom of the fitting hole of the armature 56. The downstream end of the valve body 51 is fixedly inserted into the fitting hole of the armature 56 by press fitting or welding. By integration of the armature 56 and the valve body 51, the hole 57a of the armature 56 and holes 52a, 53a of the valve body 51 which will be described below form a hole with a bottom.

The valve body 51 and the armature 56 may be integrally formed with each other.

The valve body 51 is formed of magnetic material. The valve body 51 is inserted through the opening 33a of the bottom wall of the core 30 (the bottom wall of the first core 31) with a clearance.

In this case, in the construction in which the valve head 59 is locked against movement in a direction perpendicular to the axial direction of the body 20, in order to secure the sealing performance, the valve head 59 and the sealing surface 41b must be accurately mounted such the valve head 59 is located in the middle of the sealing surface 41b of the valve seat 40. In this embodiment, in order to secure the sealing performance while facilitating the mounting operation of the valve head 59 and the sealing surface 41b, it is constructed such that only the contact surface 58 of the armature 56 mounted on the downstream end of the valve 50 contacts the core wall surface of the core 30. Thus, the valve head 59 disposed on the upstream end of the valve 50 can move around the contact surface 58 in a direction perpendicular to the axial direction of the body 20. With this construction, when the valve head 59 and the sealing surface 41b are not accurately positioned, the sealing performance is secured by tilting the valve 50 with respect to the axial direction of the body 20.

When the valve 50 is tilted with respect to the axial direction of the body 20, the contact resistance between the contact surface of the armature 56 and the core wall surface of the core 30 increases, so that the operating characteristic of the valve 50 may be deteriorated. Therefore, in this embodiment, the valve body 51 is inserted through the opening 33a of the bottom wall of the core 30 (the bottom wall of the first core 31), and the wall surface 33 defining the opening 33a restricts the movement of the valve 50 in a direction perpendicular to the axial direction of the core 20. Specifically, the wall surface 33 defining the opening 33a is utilized as a movement restricting member for the valve 50.

In the construction in which the core 30 is shaped to have a bottom (a cup-like shape) in order to provide the opening 33a for restricting the movement of the valve body 51, the fuel flow is throttled by the clearance between the opening 33a of the bottom wall of the core 30 and the valve body 51. Specifically, the clearance between the opening 33a and the valve body 51 serves as a throttle section.

With this construction, the space between the contact surface 58 of the armature 56 and the valve seat 40 (the inflow fuel passage on the upstream side of the contact surface 58) is divided into spaces 21a, 22a (the first inflow fuel passage) which are defined by the body 20, the core 30, the valve seat 40 and the valve 50 and a space 30a (the second inflow fuel passage) which is defined by the core 30 and the valve 50.

The valve body 51 has a valve body wall surface which defines a hole having a bottom. In this embodiment, the valve body 51 has valve body wall surfaces 52, 53 forming a step therebetween. The hole of the valve body 51 includes a hole 52a defined by the valve body wall surface 52 and a hole 53a defined by the valve body wall surface 53. The hole of the valve body 51 is open on the downstream side (the upper side as viewed in FIG. 1). The inner diameter of the valve body wall surface 53 (or the area of the section of the hole 53a taken perpendicularly to the axial direction) is larger than the inner diameter of the valve body wall surface 52 (or the area of the section of the hole 52a taken perpendicularly to the axial direction). The valve 50 is placed such that at least part of the hole 53a of the valve body 51 is located within the space 30a (the second inflow fuel passage).

Further, communication holes 54, 55 are formed in the valve body 51. The communication hole 54 provides communication between the hole 52a of the valve body 51 and the spaces 21a, 22a (the first inflow fuel passage). The communication hole 55 provides communication between the hole 53a of the valve body 51 and the space 30a (the second inflow fuel passage). In this embodiment, the opening space of the communication hole 55 is larger than the opening space of the communication hole 54. The shape and the number and the position of the communication holes 54, 55 can be appropriately selected.

The hole having a bottom in the valve body 51 can be formed by various methods. For example, an axially extending through hole is first formed through the valve body 51, and thereafter the upstream end of the hole is closed by the valve head 59.

The holder 60 is disposed in the core 30 (in the core space defined by the core wall surface) on the downstream side of the valve 50. The holder 60 is formed of magnetic material.

The holder 60 has a holder wall surface 61 which defines a holder space 61a axially extending through the holder 60.

The holder 60 is mounted to the core 30 such that a clearance is formed between the upstream end surface of the holder 60 and the downstream end surface of the armature 56 when the valve head 59 is in contact with the sealing surface 41b of the valve seat 40. Further, the holder 60 and the valve 50 (the armature 56) are placed such that the upstream end of the holder 60 and the downstream end of the armature 56 are located on the third core wall surface 37 of the third core 36 formed of nonmagnetic material. Thus, magnetic flux effectively flows between the armature 56 and the holder 60.

A spring adjuster 65 is disposed within the holder 60 (in the holder space 61a defined by the holder wall surface 61). The spring adjuster 65 has a spring adjuster wall surface 66 which defines a spring adjuster space 66a axially extending through the spring adjuster. A spring 68 is disposed between the spring adjuster 65 and the armature 56 of the valve 50. The spring 68 generates an elastic force of moving the valve 50 in the direction in which the valve head 59 contacts the sealing surface 41b. The elastic force to act upon the valve 50 can be adjusted by adjusting the position of the spring adjuster 65.

The electromagnetic driving section 70 includes a bobbin 71 and a coil 72. The coil 72 is wound on the bobbin 71. The bobbin 71 is disposed outside the core 30.

The housing 80 formed of resin is provided outside the core 30 and the bobbin 71. A connector 80 is formed in the housing 80. A terminal 82 is provided in the connector 81 and connected to the coil 72. Thus, the coil 72 can be connected to an external power source via the terminal 82.

When current is supplied to the coil 72, magnetic flux is generated from the coil 72 and flows via the first core 31, the armature 56, the holder 60 and the second core 34. As a result, an electromagnetic force for moving the armature 56 is generated between the holder 60 and the armature 56. The direction and magnitude of the force to act upon the armature 56 (the valve 50) are determined according to the direction and magnitude of current to be supplied to the coil 72. For example, an electromagnetic force is generated to move the valve 50 in the direction in which the valve head 59 moves away from the sealing surface 41b. In this embodiment, the operating pressure (pressure limit) on the valve 50 is determined by the sum of the elastic force of the spring 68 and the electromagnetic force. Preferably, it is constructed such that the amount of movement of the valve 50 by the electromagnetic force can be larger than the amount of movement of the valve 50 by the change of fuel pressure. With such construction, the operating characteristic of the valve 50 can be adjusted by adjusting the electromagnetic force.

A fuel filter 90 is provided on the fuel inlet 10A side in the body space defined by the body wall surface 21 of the body 20.

In this embodiment, the hole 52a of the valve body 51 is a feature that corresponds to the "first hole of the valve" according to the present invention, and the hole 53a of the valve body 51 and the hole 57a of the armature 56 to the "second hole of the valve". The holes 52a, 53a, 57a form the "hole of the valve, having a bottom and open on the downstream side" according to this invention.

Further, the spaces 21a, 22a defined by the body 20, the core 30, the valve seat 40 and the valve 50 are features that correspond to the "first inflow fluid passage" according to the present invention, and the space 30a defined by the core 30 and the valve 50 to the "second inflow fluid passage". The spaces 21a, 22a, 30a form the "inflow fluid passage provided on the upstream side of the contact surface of the valve" according to this invention.

Further, the space (including the holes 52a, 53a, 57a) defined by the core 30, the valve 50 and the holder 60 is a feature that corresponds to the "outflow fluid passage provided on the downstream side of the contact surface of the valve" according to this invention.

Further, the communication holes 55 and 54 of the valve body 51 are features that correspond to the "first communicating hole" and the "second communicating hole", respectively, according to the present invention. At least one communication hole 55 comprises "first communication par" according to this invention and at least one communication hole 54 comprises "second communication part" according to this invention.

Further, the spaces 21a, 22a (the first inflow fluid passage), the communication hole 54 (the second communicating part), the communication hole 55 (the first communicating part), the spaces 61a, 66a and the holes 52a, 53a, 57a (the outflow fluid passage) form the "fuel passage" according to this invention.

In the relief valve 10 of this embodiment, the valve 50 moves by the pressure of fuel flowing in through the fuel inlet 10a, the elastic force of the spring 68, and the electromagnetic force according to the current supplied to the coil 72.

The relief valve 10 of this embodiment operated as follows.

When the pressure of fuel flowing in through the fuel inlet 10A is lower than the set pressure, which is determined based on the elastic force generated by the spring 68 and the electromagnetic force generated by the coil 72, the valve 50 moves in the valve closing direction (downward as viewed in FIG. 1). As a result, the valve head 59 contacts the sealing surface 41b of the valve seat 40, so that the valve seat space 41a is closed. Therefore, the fuel flowing in through the fuel inlet 10A is not discharged from the fuel outlet 10B.

When the pressure of fuel flowing in through the fuel inlet 10A reaches a set pressure, the valve 50 moves in the valve opening direction (upward as viewed in FIG. 1). As a result, the contact between the valve head 59 and the sealing surface 41b of the valve seat 40 is released, so that the valve seat space 41a is opened. Therefore, the fuel flowing in through the fuel inlet 10A is discharged from the fuel outlet 10B via the valve seat space 41a, the spaces 21a, 22a (the first inflow fluid passage), the communication hole 54 (the second communication hole), the holes 52a, 53a, 57a and the space 61a (the outflow fluid passage).

At this time, fuel also flows into the space 30a (the second inflow fluid passage) defined by the valve 50 and the core 30, via the spaces 21a, 22a (the first inflow fluid passage) and the clearance (the throttle section) between the opening 33a and the valve body 51. If the communication hole 55 (the first communication hole) is not provided, the pressure of fuel within the space 30a will increase. The fuel pressure within the space 30a acts upon the valve 50 to move the valve 50 in the direction in which the valve head 59 moves away from the valve seat 40. Increase of the fuel pressure within the space 30a has a significant influence on the movement of the valve 50 because the fuel pressure within the space 30a directly acts upon the armature 56. Therefore, even if the pressure of the fuel flowing in through the fuel inlet 10A is reduced to below the set pressure, the valve 50 may not move in the valve closing direction. In this case, the pressure of the fuel flowing in through the fuel inlet 10A or the fuel to be supplied to the fuel injector will be reduced.

In this embodiment, the communication hole 55 (the first communication hole) for providing communication between the space 30a (the second inflow fluid passage) defined by the valve 50 and the core 30 and the hole 53a (the second hole) of the valve body 51 is provided. Therefore, the fuel within the space 30a is discharged from the fuel outlet 10B via the communication hole 55 and the hole 53a. As a result, increase of fuel pressure within the space 30a can be prevented, so that the operating characteristic of the valve 50 can be enhanced.

In this embodiment, the sectional area of the hole 53a is larger than the sectional area of the hole 52a, and the opening space of the communication hole 55 is larger than the opening space of the communication hole 54. With this configuration, increase of fuel pressure within the space 30a can be effectively prevented.

When the pressure of fuel flowing in through the fuel inlet 10A is reduced to below the set pressure, the valve 50 moves in the valve closing direction. At this time, the movement of the valve 50 in the valve closing direction is not prevented because increase of pressure within the spaces 21a, 22a, 30a (particularly, the pressure within the space 30a which directly acts upon the armature 56) is prevented. As a result, the valve head 59 contacts the sealing surface 41b of the valve seat 40. Therefore, the fuel flowing in through the fuel inlet 10A is not discharged from the fuel outlet 10B.

Increase of pressure within the spaces 21a, 22a, 30a can be prevented by communication between the spaces 21a, 22a and the hole 52a through the communication hole 54 and by communication between the space 30a and the hole 53a through the communication hole 55.

In order to prevent increase of pressure within the spaces 21a, 22a, 30a, it is preferable that the sum of the total opening space of the communication hole 54 and the total opening space of the communication hole 55 is larger. Now, the proper total opening space of the communication holes will be described.

The relief valve 10 shown in FIG. 1 has a double throttle structure having a throttle structure formed by the sealing surface 41b of the valve seat 40 and a throttle structure formed by the communication holes 54, 55. Such a relief valve (fluid pressure regulating valve) having a double throttle structure is illustrated by the model shown in FIG. 2.

Figure 2:
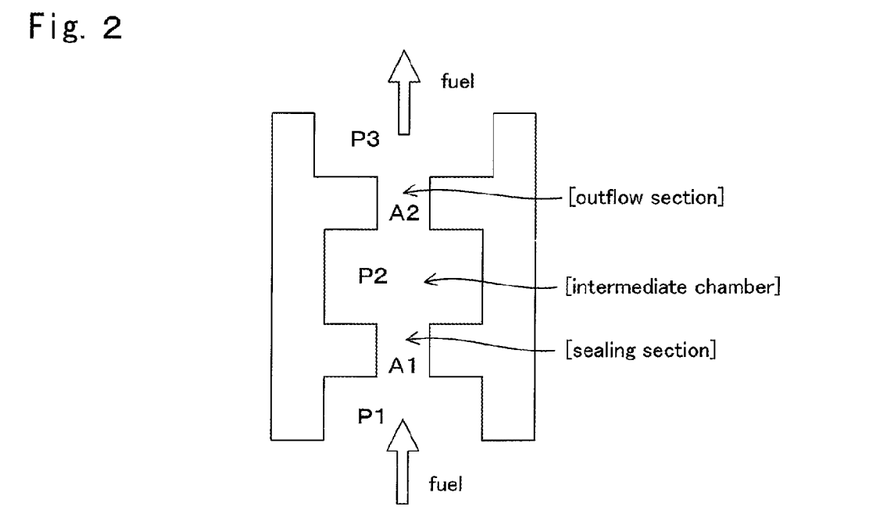
FIG. 2 shows a model of a relief valve having a double throttle structure.

In FIG. 2, P1 designates the pressure of fuel flowing in through the fuel inlet 10A. P2 designates the pressure of fuel within an intermediate chamber (the inflow fluid passage comprising the spaces 21a, 22a, 30a). P3 designates the pressure of fuel discharged from the fuel outlet 10B (pressure of fuel within the holes 52a, 53a, 57a and the spaces 66a, 61a).

Further, A1 designates the opening space (the minimum opening space of the sealing surface 41b of the valve seat 40) of the sealing section having a throttle structure between the fuel inlet 10A and the intermediate chamber (the inflow fluid passage comprising the spaces 21a, 22a, 30a). A2 designates the opening space (the sum of the total opening space of the communication hole 54 and the total opening space of the communication 55) of the outflow section having a throttle structure between the intermediate chamber (the inflow fluid passage comprising the spaces 21a, 22a, 30a) and the outflow fluid passage.

The fuel pressure (ON pressure) at which the relief valve performs a discharging movement is different from the fuel pressure (OFF pressure) at which the relief valve stops the discharging movement. The ON pressure and the OFF pressure vary by the pressure P2 within the intermediate chamber.

Generally, the difference between the ON pressure and the OFF pressure of a mechanical relief valve is limited to 1.1 MPa.

With a relief valve having the construction shown in FIG. 1 and having a typical size (the minimum opening space A1 of the sealing surface 41b) to regulate the pressure of fuel to be supplied to a fuel injector of an internal combustion engine, inventors of this invention have obtained the range of P2/P1 in which the difference between the ON pressure and the OFF pressure can be limited to 1.1 MPa when the fuel pressure P1 is in the typical range of about 3 MPa to 30 MPa, using the opening space P2 of the outflow section as a parameter. As a result, it has been found that P2/P1 should be 0.004 or less (P2/P1≦0.004) in order to limit the difference between the ON pressure and the OFF pressure to 1.1 MPa within the typical ranges of size and fuel pressure.

With the relief valve having a double throttle structure shown in FIG. 2, the pressure P2 is expressed by Equation 1 below.

$$P2=(P1 \times A1^2+P3 \times A2^2)/(A1^2+A2^2) \quad \text{(Equation 1)}$$

From Equation 1, A2/A1 is expressed by Equation 2 below.

$$A2/A1=(1-P2/P1)/(P2/P1-P3/P1) \quad \text{(Equation 2)}$$

Substituting P3=0 and P2/P1≧0.004 into Equation 2 yields Equation 3 below.

$$A2/A1 \leqq 15.8 \quad \text{(Equation 3)}$$

Therefore, the difference between the ON pressure and the OFF pressure which varies by pressure increase of fuel within the intermediate chamber (the first inflow fluid passage 21a, 22a and the second inflow fluid passage 30a) can be limited to 1.1 MPa by setting the opening space A2 of the outflow section (the sum of the total opening space of the communication hole 54 and the total opening space of the communication hole 55) to sixteen times or more larger than the opening space A1 of the sealing section (the minimum opening space of the sealing surface 41b of the valve seat 40) (A2≧16×A1). The upper limit of A2/A1 is determined according to the characteristics of the fluid pressure regulating device or other similar factors.

When only either one of the communication holes 54, 55 is provided, the total opening space of the communication hole 54 or the total opening space of the communication hole 55 is used as the sum of the total opening space of the communication hole 54 and the total opening space of the communication hole 55. When only one of the communication holes is provided, preferably, the communication hole 55 that prevents pressure increase of the fuel within the space 30a may be provided.

Next, the configuration of the contact surface of the valve 50 or the contact surface (sliding surface) 58 of the armature 56 will be explained.

In this embodiment, the valve head 59 contacts the sealing surface 41b of the valve seat 40 by movement of the valve 50 in the valve closing direction.

In this case, if the valve head 59 is locked against movement in a direction perpendicular to the axial direction of the body 20, in order to secure the sealing performance, the valve head 59 and the sealing surface 41b must be accurately mounted such the valve head 59 is located in the middle of the sealing surface 41b of the valve seat 40.

In this embodiment, in order to secure the sealing performance while facilitating the mounting operation of the valve head 59 and the sealing surface 41b, it is constructed such that only the contact surface 58 of the armature 56 of the valve 50 contacts the core wall surface of the core 30 and the valve head 59 can move in a direction perpendicular to the axial direction of the body 20. With this construction, when the valve head 59 and the sealing surface 41b are not accurately aligned with respect to each other, the valve 50 moves as shown by solid line or broken line in FIG. 3. Specifically, the valve head 59 moves along the sealing surface 41b and the valve 50 is tilted with respect to the axial direction of the body 20. Thus, the sealing performance can be secured by provision of the construction that allows the valve 50 to be tilted with respect to the axial direction of the body 20. Therefore, the mounting operation of the valve head 59 and the sealing surface 41*b* can be facilitated while the sealing performance can be secured.

Figure 3:
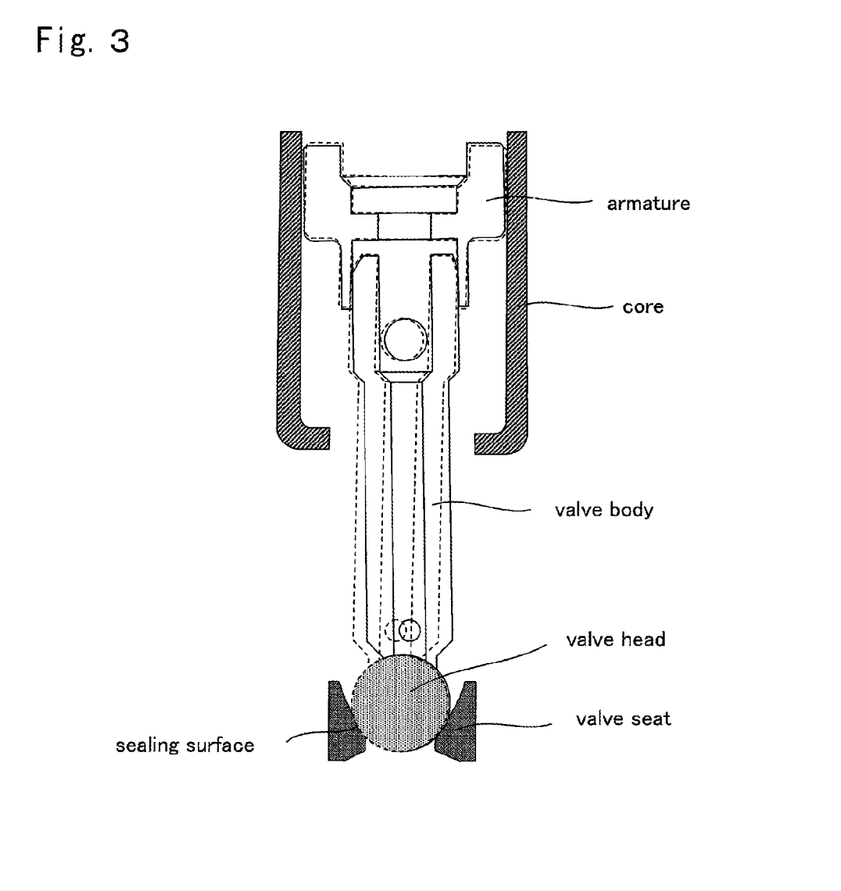
FIG. 3 illustrates movement of a valve.

However, when the valve 50 is tilted with respect to the axial direction of the body 20, the contact surface 58 of the armature 56 of the valve 50 also contacts the core wall surface of the core 30 on a tilt.

Figure 4:
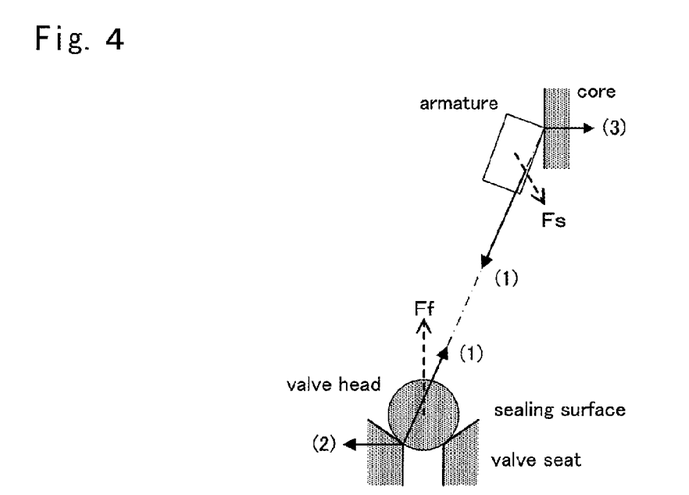
FIG. 4 illustrates loading of each part.

At this time, as shown in FIG. 4, pressure Ff of fuel is exerted on the valve head 59, and elastic force Fs of the spring 68 is exerted on the armature 56. Therefore, contact resistance (sliding resistance) corresponding to a component force (3) (surface pressure) of the elastic force Fs is generated between the contact surface 58 of the armature 56 and the core wall surface of the core 30.

If the contact surface 58 of the armature 56 is linear when viewed in a section taken along its axis, the contact resistance (sliding resistance) is very high. For example, in the relief valve as shown in FIG. 6, the contact resistance (sliding resistance) is about 25 times higher. Therefore, the operating characteristic of the valve is deteriorated, and the amount of wear increases. Further, the contact resistance (sliding resistance) changes by the wear, so that the operating pressure of the valve 50 changes.

Figure 5:
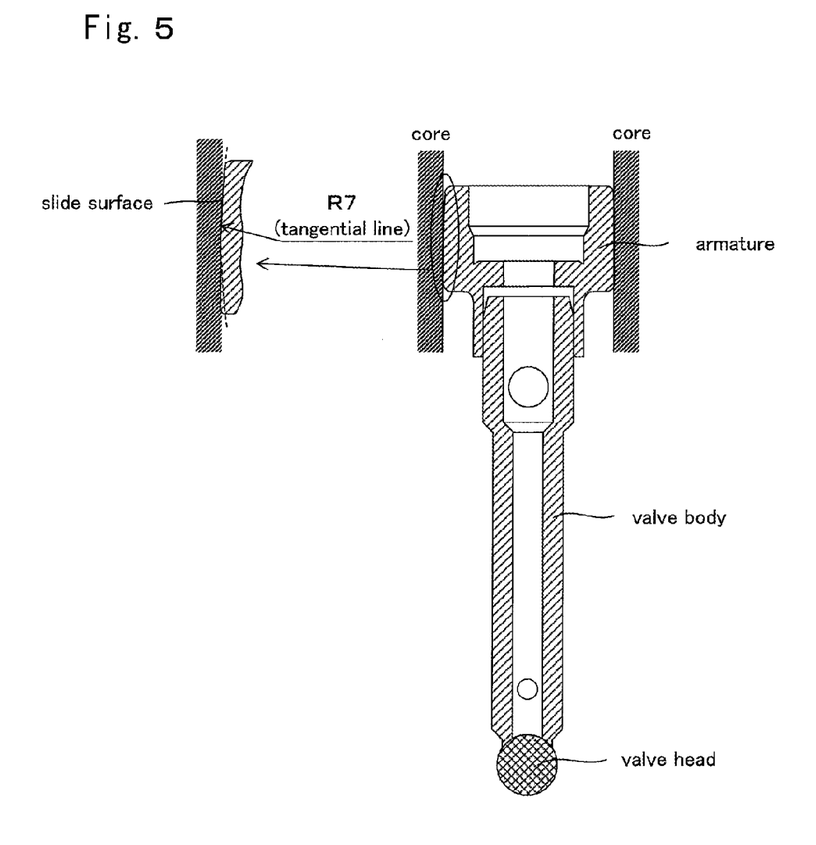
FIG. 5 is an enlarged view of the valve.

Therefore, in this embodiment, as shown in FIG. 5, the contact surface (sliding surface) 58 of the armature 56 is formed to have a circular arc shape having a radius of 7 mm or more (R7 shape) when viewed in a section taken along its axis. In this case, only at least a region of the contact surface 58 of the armature 56 which may possibly contact the core wall surface of the core 30 when the valve 50 tilts may have the R7 shape. For example, a downstream region of the contact surface 58 of the armature 56 may have the R7 shape.

With this configuration, the surface pressure between the contact surface (sliding surface) 58 of the armature 56 and the core wall surface of the core 30 decreases, so that the contact resistance (sliding resistance) decreases. Therefore, the amount of wear can be reduced, and deterioration in the operating characteristic of the valve can be prevented.

Further, preferably, the relief valve of this embodiment may be subjected to an aging process after manufactured and before the operating pressure of the valve is set, such that initial wear is caused. By the initial wear caused before the operating pressure of the valve is set, the contact resistance (sliding resistance) is stabilized. Therefore, the operating characteristic of the valve can be prevented from being changed due to wear after the operating pressure of the valve is set.

The present invention is not limited to the construction as described above, but rather, may be added to, changed, replaced with alternatives or otherwise modified.

For example, in this embodiment, the present invention is described as being applied to regulate the pressure of fuel to be supplied to a fuel injector of an internal combustion engine. However, the present invention can also be applied to various other cases for regulating the pressure of fluid.

The constructions described in this embodiment may be used separately or in combination of appropriately selected ones of the constructions.

In this embodiment, the valve body 51 and the armature 56 are formed separately, but they may be integrally formed with each other.

In this embodiment, the inner diameter (sectional area) of the hole 53*a* (the second hole) of the valve body 51 is larger than the inner diameter (sectional area) of the hole 52*a* (the first hole), but the holes 53*a*, 52*a* may have the same inner diameter (sectional area).

In this embodiment, the total opening space of the communication hole 55 (the first communicating part) of the valve body 51 is larger than the total opening space of the communication hole 54 (the second communicating part), but the communication holes 54, 55 may have the same total opening space.

In this embodiment, the communication hole 54 (the second communication hole) for providing communication between the hole 52*a* (the first hole) of the valve body 51 and the spaces 21*a*, 22*a* (the first inflow fuel passage) and the communication hole 55 (the first communication hole) for providing communication between the hole 53*a* (the second hole) of the valve body 51 and the space 30*a* (the second inflow fuel passage) are provided, but only the communication hole 55 (the first communication hole) may be provided. Even only with the communication hole 55, the operating characteristic of the valve 50 can be prevented from being deteriorated due to pressure increase of fluid within the space 30*a* (the second inflow fuel passage).

In this embodiment, the communication hole 55 (the first communication hole) for providing communication between the space 30*a* (the second inflow fuel passage) and the hole 53*a* (the second hole) of the valve body 51 is provided, but another communication hole for providing communication between the space 30*a* and the space 61*a* may also be provided.

In this embodiment, the first communicating part and the second communication part respectively comprise at least one communication hole, but not limited to the communication hole.

In this embodiment, the spaces (the first and second inflow fuel passages) that store fluid exist on the upstream side of the contact surface 58 of the armature 56 of the valve 50. However, the technique disclosed here can also be applied to the case in which a space that stores fluid exists on the downstream side of the contact surface 58. For example, the spring adjuster 65 may be provided on the downstream side of the contact surface, and a first outflow fluid passage that stores fluid between the valve 50 and the spring adjuster 65 and a second outflow fluid passage that communicates with the first outflow fluid passage via a throttle section (a fluid passage defined in the spring adjuster 65) may be provided. In this case, a communicating part (for example, a communication hole) for providing communication between the first outflow fluid passage and the second outflow fluid passage may be provided. In this manner, pressure increase of fluid which causes the valve to open or deterioration of the operating characteristic of the valve due to pressure increase of fuel within the first outflow fluid passage can be prevented.

In this embodiment, the inflow fuel passage comprises the first and second inflow fuel passages, but the construction of the inflow fuel passage is not limited to this. Even in such a case, the difference between the ON pressure and the OFF pressure which vary by the pressure increase within the inflow fuel passage can be limited to 1.1 MPa by setting the total opening space of the communicating part to sixteen times or more larger than the opening space of the valve seat.

The construction of the fluid pressure regulating device is not limited to the construction shown in FIG. 1.

What we claimed is:

1. A fluid pressure regulating device for regulating pressure of fluid, including a fluid inlet, a fluid outlet, a fluid passage provided between the fluid inlet and the fluid outlet, a valve seat disposed in the fluid passage, a valve that can move along the fluid passage and includes a contact surface that contacts a wall surface defining the fluid passage, and a valve head that can contact the valve seat, and an elastic force generating member that generates an elastic force of moving the valve in a direction in which the valve head contacts the valve seat, the fluid passage including an inflow fluid passage disposed on the upstream side of the contact surface of the valve and an outflow fluid passage disposed on the downstream side of the contact surface of the valve, and a first communicating part that provides communication between the inflow fluid passage and the outflow fluid passage, wherein:

the inflow fluid passage includes a first inflow fluid passage, a second inflow fluid passage disposed on the downstream side of the first inflow fluid passage, and a throttle section disposed between the first inflow fluid passage and the second inflow fluid passage, the valve has a hole having a bottom and open on the downstream side, the hole of the valve has a first hole and a second hole that is disposed on the downstream side of the first hole and has a larger section perpendicular to its axial direction than the first hole, and the valve is inserted through the throttle section with a clearance, and the first communicating part comprises at least one first communication hole that provides communication between the second inflow fluid passage and the second hole of the valve.

2. The fluid pressure regulating device as defined in claim 1, further comprising a second communicating part that provides communication between the first inflow fluid passage and the first hole of the valve.

3. The fluid pressure regulating device as defined in claim 2, wherein the second communicating part comprises at least one second communication hole that provides communication between the first inflow fluid passage and the first hole of the valve.

4. The fluid pressure regulating device as defined in claim 2, wherein the total opening space of the first communicating part is larger than that of the second communicating part.

5. The fluid pressure regulating device as defined in claim 2, wherein the sum of the total opening space of the first communicating part and the total opening space of the second communicating part is sixteen times or more larger than the opening space of the valve seat.

6. The fluid pressure regulating device as defined in claim 1, wherein the contact surface of the valve has a circular arc shape having a radius of 7 mm or more.

\* \* \* \* \*